US006631334B2

(12) United States Patent
Grosshart

(10) Patent No.: US 6,631,334 B2
(45) Date of Patent: Oct. 7, 2003

(54) PRESSURE-BASED MASS FLOW CONTROLLER SYSTEM

(75) Inventor: Paul Francis Grosshart, Hanson, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/748,472

(22) Filed: Dec. 26, 2000

(65) Prior Publication Data
US 2002/0082783 A1 Jun. 27, 2002

(51) Int. Cl.$^7$ ............................................. G06F 19/00
(52) U.S. Cl. .......................................... 702/50; 118/726
(58) Field of Search ............................ 118/726, 715.5; 137/334, 882, 269; 702/50, 47; 427/8

(56) References Cited

U.S. PATENT DOCUMENTS

| | | | |
|---|---|---|---|
| 3,851,526 A | 12/1974 | Drexel | 73/202 |
| 4,951,224 A | 8/1990 | Hokynar | |
| 5,427,149 A * | 6/1995 | Higgs | 137/882 |
| 5,445,035 A | 8/1995 | Delajoud | 73/861.52 |
| 5,791,369 A | 8/1998 | Nishino et al. | |
| 5,868,159 A * | 2/1999 | Loan et al. | 137/334 |
| 6,074,691 A | 6/2000 | Schmitt et al. | |
| 6,296,711 B1 * | 10/2001 | Loan et al. | 118/726 |
| 2001/0035127 A1 * | 11/2001 | Metzner et al. | 118/715 |

FOREIGN PATENT DOCUMENTS

EP 0969342 1/2000

OTHER PUBLICATIONS

MKS Instruments, Vapor Source Mass–Flo Controllers Types 1150C &1152C, 02/99, MKS Instruments, Inc. Bulletin 1150/2–2/99.
MKS Instruments, Vapor/Liquid Flow Controller Options, 12/99, MKS Instruments, Inc. Bulletin Vapor/Liquid Spec–12/99.
MKS Instruments, Low Vapor Pressure Source Mass Flow Controller Type 1153, Feb. 1998, MKS Instruments, Inc. Bulletin 1153–2/98.
MKS Instruments, Pressure–Based Mass–Flo Controller For Ion Implant Applications Type 1640, 04/00, MKS Instruments, Inc. Bulletin 1640–4/00.

* cited by examiner

Primary Examiner—John Barlow
Assistant Examiner—Xiuqin Sun

(57) ABSTRACT

A pressure based mass flow controller includes a flow path for connection to a fluid source, a flow restrictor dividing the flow path into an upstream reservoir and a downstream reservoir, an upstream pressure measurement device connected to the upstream reservoir, and a flow valve connected to the flow path. The controller also includes a control device programmed to receive a desired flow rate, an indication of upstream pressure from the upstream pressure measurement device, an indication of downstream pressure from a remote downstream pressure measurement device connected to the downstream reservoir.

16 Claims, 4 Drawing Sheets

PRESSURE-BASED MASS FLOW CONTROLLER SYSTEM

FIELD OF DISCLOSURE

The present disclosure relates to the field of fluid flow measurement and control and, more particularly, to a pressure-based mass flow controller system for accurately controlling the delivery of low pressure vapors from a plurality of precursors.

BACKGROUND OF DISCLOSURE

In the semiconductor manufacturing industry, it is necessary to achieve precise control of the quantity, temperature and pressure of one or more reactant materials which are delivered in the gaseous state to a reaction chamber. Some process reactants, such as nitrogen gas, are relatively easy to deliver in a controlled manner at the temperatures and pressures required for the reaction to occur. Other reactants, however, may be highly corrosive, toxic, pyrophoric, or unstable at the temperatures and/or pressures at which delivery to the reaction chamber is required. Such characteristics of the reactants make their accurate and controlled delivery to a reaction chamber extremely difficult to achieve.

Mass flow controllers (hereinafter, "MFCs") are widely used in the industry to control the delivery of process reactants. Two broad categories of MFCs, thermal and pressure-based, have been developed to handle the diverse delivery requirements of a wide variety of process reactants. Thermal mass flow controllers operate on the principle that the rate of heat transfer from the walls of a flow channel to a fluid flowing in laminar flow within the channel is a function of the difference in temperatures of the fluid and the channel walls, the specific heat of the fluid, and the mass flow rate of the fluid. Thus, the rate of mass flow of a fluid (in the laminar flow regime) can be determined if the properties of the fluid and the temperatures of the fluid and tube are known.

On the other hand, pressure-based MFCs operate on the principle that changes in fluid pressure induce deflections in a deformable electrode, the deflections causing corresponding changes in the electrical capacitance of the deformable electrode and a stationary one coupled therewith. Pressure-based MFCs, which include, for example, capacitance manometer pressure transducers, are capable of controllably delivering process reactants at inlet pressures of less than 1 torr to greater than atmospheric pressure (760 torr).

Distinct flow regimes of a flowing fluid are recognized and defined by different pressure profiles within the fluid. Molecular flow occurs at fluid pressures of less than about 1 torr, and the flow rate of a fluid through a flow restrictive device, such as a nozzle, in the molecular flow regime is proportional to the pressure drop across the flow restrictive device. Laminar flow occurs at fluid pressures of greater than about 10 torr, and the flow rate of a fluid through a flow restrictive device in the laminar flow regime is proportional to the difference of the squares of the upstream and downstream pressures.

The pressure-based mass flow controllers disclosed in, for example, U.S. Pat. No. 3,851,526 to Drexel and U.S. Pat. No. 5,445,035 to Delajoud operate on the assumption that the fluid flow remains laminar. This assumption of laminar fluid flow limits the utility of these pressure-based MFCs to laminar flow conditions and leads to inaccuracies when such MFCs are used to characterize non-laminar flows.

In another pressure-based mass flow controller, exemplified by the Model 1150 mass flow controller manufactured and sold by the assignee of the present disclosure, the necessity for assuming laminar flow is avoided by creation of a viscous choked flow condition in the system. To establish viscous choked flow, two pressure reservoirs are created along the flow path of the fluid, for example, by introducing a restriction in the diameter of the flow path using means for defining a flow restrictive aperture, such as an orifice or nozzle. In the reservoir upstream of the flow restrictive aperture the fluid has a pressure $P_1$ and a density $\rho_1$, and in the reservoir downstream of the flow restrictive aperture the fluid has a pressure $P_2$ and a density $\rho_2$.

As can be seen in the graph of FIG. 1, the relationship between mass flow of a fluid and the fluid pressure upstream of a flow restrictive device is linear above a certain critical pressure and nonlinear below that critical pressure. More specifically, when the upstream pressure $P_1$ is at least twice as great as the downstream pressure $P_2$ (i.e., $P_1/P_2 \geq 2$,) the flow is said to be choked, and the flow rate is a function only of $P_1 \rho_1$ and the cross-sectional area A of the flow restrictive aperture. In general, choked flow is typically established by maintaining the upstream fluid supply at a pressure that is always at least about twice that of the fluid in the downstream processing chamber. In a choked flow regime, as the pressure of the fluid in the upstream reservoir increases, the density and flow rate of the fluid also increase.

As shown in the graph of FIG. 1, this relationship between flow rate and upstream pressure is linear so long as the upstream pressure remains at least twice that of the downstream pressure. However, when the upstream pressure is less than twice the downstream pressure (i.e., $P_1/P_2 < 2$,), the flow is said to be unchoked and the relationship between mass flow rate and downstream fluid pressure is nonlinear.

The pressure at which a precursor fluid (typically a gas) in the upstream reservoir of a choked flow system is maintained is, in part, a function of the vapor pressure of the precursor (liquid or solid) from which the gas is derived and the desired quantity of precursor to be delivered. Some precursors, typically liquids, used in vapor deposition processes have vapor pressures which are sufficiently high to ensure their delivery at a pressure which establishes choked flow and thus allows accurate measurement of mass flow. Other precursors, particularly low vapor pressure liquids and non-dissolved solids which must be sublimed to provide reactants in gaseous form, typically cannot be delivered at a sufficiently high pressure to ensure choked flow. As a result, the mass flow rate of such precursors cannot be accurately or reliably determined.

No special provision was made to permit a pressure-based MFC, calibrated for choked flow operation, to operate in the non-linear, non-choked flow region. In the Model 1150 mass flow controller, for example, only the upstream fluid pressure is measured, although computer modeling is used to predict the mass flow in the non-linear range. In such choked-flow devices, any measurements of flow rate are assumed to be linearly related to the upstream pressure, as seen by the dotted line A in FIG. 1, even though the upstream pressure is actually less than twice the downstream pressure. In the non-choked flow regime, i.e., when the upstream pressure is less than twice the downstream pressure, the flow rate of the fluid varies as a function of the downstream fluid pressure and is independent of the upstream fluid pressure.

In a more recent pressure-based mass flow controller, exemplified by the Model 1153 mass flow controller manufactured and sold by the assignee of the present disclosure, the necessity for assuming the flow rate is linearly related to the upstream pressure, even in the non-choked flow regime, is avoided. The controller includes a flow restrictive element in the precursor flow path, and the pressures of the fluid upstream and downstream of the flow restrictive element are measured. The ratio of the upstream and downstream fluid pressures is computed to determine whether the flow is choked or non-choked. The mass flow of the precursor fluid is then computed by a CPU in accordance with a linear function of the upstream pressure, for choked flow, and in accordance with a nonlinear function of both the upstream and downstream pressures, for non-choked flow. Frequent re-calibration of the mass flow controller is not needed.

What is desired now is mass flow controller system which is suitable for use in the delivery of many types of precursor materials over a relatively wide range of operating temperatures, pressures and flow rates, without the need for frequent re-calibration.

SUMMARY OF DISCLOSURE

The present disclosure provides a pressure based mass flow controller for controlling the flow rate of a vapor from a source. Such a controller can be used, for example, in the semiconductor manufacturing industry to precisely deliver a process vapor to a process chamber for making a semiconductor wafer. The disclosed flow controller can be used with a low vapor pressure source, and has a simplified, novel design, that allows the disclosed flow controller to be easily and inexpensively incorporated in a system including a plurality of mass flow controllers and a plurality of vapor sources.

The flow controller includes a flow path for connection to a vapor source, a flow restrictor dividing the flow path into an upstream reservoir and a downstream reservoir, an upstream pressure measurement device connected to the upstream reservoir, and a flow valve connected to the flow path before the upstream reservoir.

The flow controller also includes a control device programmed to receive a predetermined desired flow rate, receive an indication of upstream pressure from the upstream pressure measurement device, and receive an indication of downstream pressure from a remote downstream pressure measurement device connected to the downstream reservoir. The control device is also programmed to determine an actual mass flow rate of vapor through the flow path during choked flow conditions in accordance with a linear function of the upstream pressure, and determine the actual mass flow rate of the vapor through the flow path during non-choked flow conditions in accordance with a nonlinear function of the upstream pressure and the downstream pressure.

Choked flow conditions exist when the upstream pressure is at least equal to about twice the downstream pressure, and non-choked flow conditions exist when the upstream pressure is less than about twice the downstream pressure. The control device is also programmed to instruct the flow valve to increase flow if the actual flow rate is less than the desired flow rate, and to decrease flow if the actual flow rate is greater than the desired flow rate.

The present disclosure also provides a system for controlling the flow rates of vapors derived from a plurality of sources. The system includes a mass flow controller as described above for each of the plurality of sources. The system further includes a manifold connecting the downstream reservoirs of the mass flow controllers, and a downstream pressure measurement device connected to the manifold for providing an indication of the downstream pressure to the control devices of the flow controllers.

Another system for controlling the flow rates of vapors derived from a plurality of sources is also provided. The system includes a flow path for connection to each of the plurality of vapor sources, flow restrictors dividing each of the flow paths into an upstream reservoir and a downstream reservoir, and upstream pressure measurement devices connected to each of the upstream reservoirs. A manifold connects the downstream reservoirs of the mass flow controllers, and a downstream pressure measurement device connected to the manifold.

The system also includes a control device programmed to, for each flow path, receive an indication of upstream pressure from the upstream pressure measurement device of the flow path, and receive an indication of downstream pressure from the downstream pressure measurement device. The control device then determines an actual mass flow rate of vapor through the flow path in accordance with a linear function of the upstream pressure during choked flow conditions, and determines the actual mass flow rate of the vapor through the flow path in accordance with a nonlinear function of the upstream pressure and the downstream pressure during choked flow conditions.

BRIEF DESCRIPTION OF DRAWINGS

The foregoing and other features and advantages of this disclosure will be better understood from the detailed description and the drawings, in which.

DETAILED DESCRIPTION OF DISCLOSURE

Figure 1:
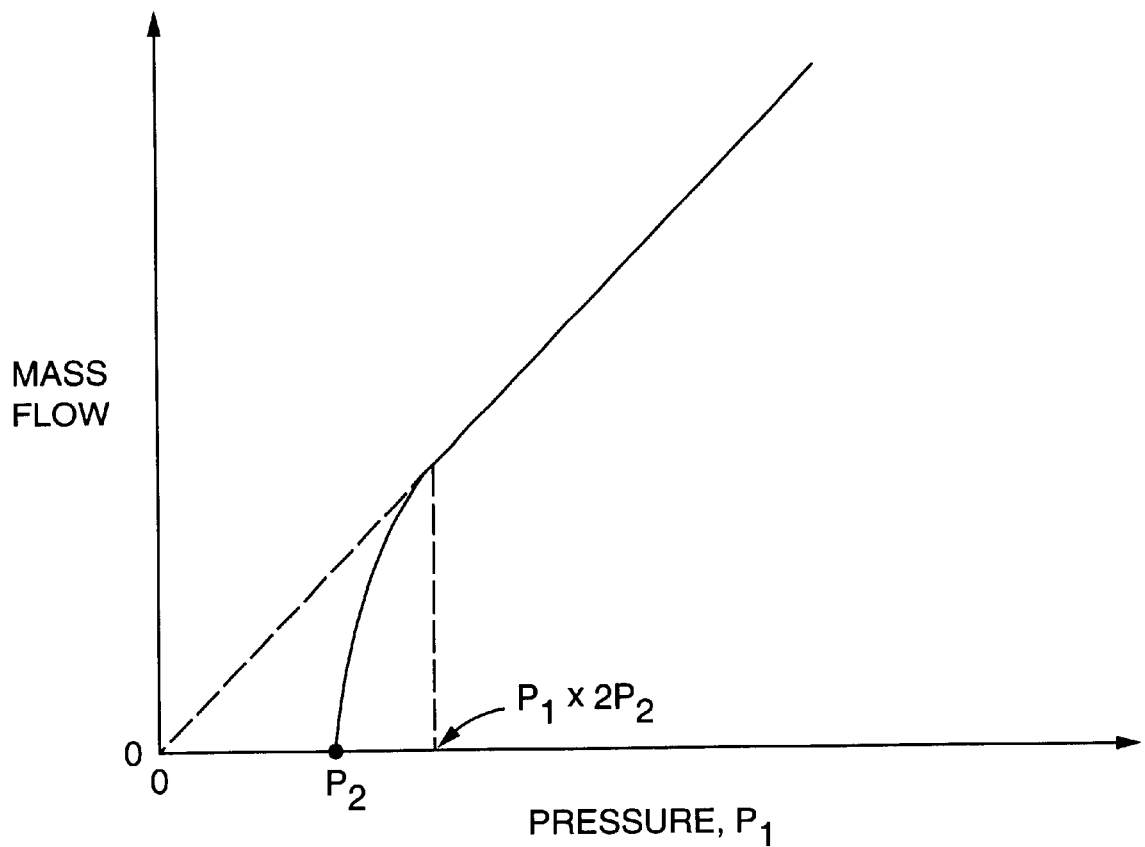
FIG. 1 is a graph illustrating the relationship of mass flow and the pressure drop of a fluid across a flow restrictive element defining an upstream and downstream reservoir. The graph illustrates both choked and non-choked flow conditions.
Figure 2:
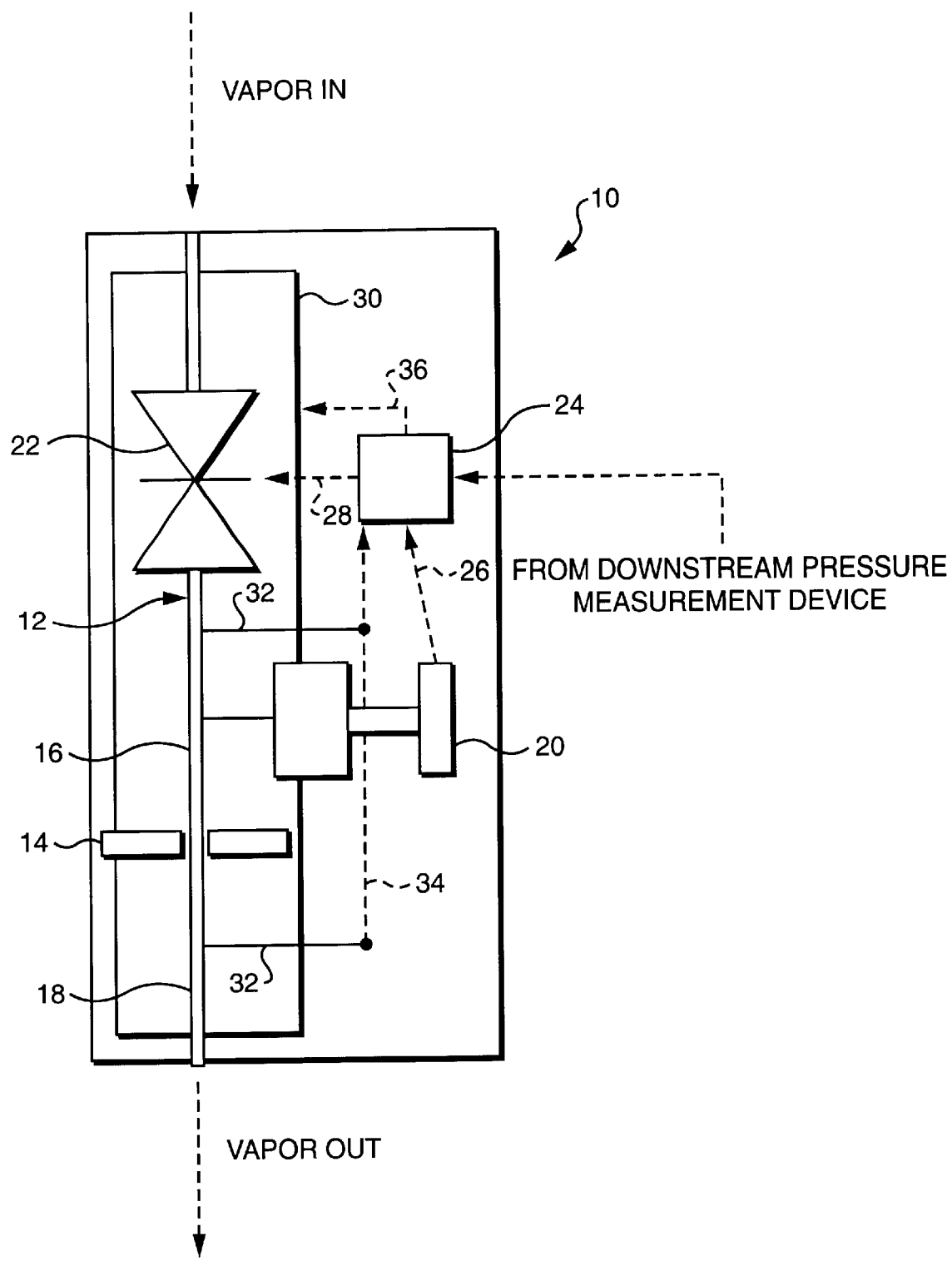
FIG. 2 is a simplified schematic diagram of a pressure-based mass flow controller according to the present disclosure.

Referring to FIG. 2, the present disclosure provides a pressure-based mass flow controller (MFC) 10 for controlling the flow rate of a vapor from a source. Such a controller 10 can be used, for example, in the semiconductor manufacturing industry to precisely deliver a process vapor to a process chamber for making a semiconductor wafer. The disclosed MFC 10 can be used with a low vapor pressure source, and has a simplified, novel design, that allows the disclosed flow controller 10 to be easily and inexpensively incorporated in a system including a plurality of mass flow controllers and a plurality of vapor sources.

The MFC 10 includes a flow path 12 for connection to a vapor source, a flow restrictor 14 dividing the flow path into an upstream reservoir 16 and a downstream reservoir 18, an upstream pressure measurement device 20 connected to the upstream reservoir, and a flow valve 22 connected to the flow path before the upstream reservoir.

The MFC 10 also includes a control device 24 programmed to receive a predetermined desired flow rate, receive an indication of upstream pressure from the upstream pressure measurement device 20 (as indicated by control circuitry 26), and receive an indication of downstream pressure from a remote downstream pressure measurement device (not shown) connected to the downstream reservoir 18. The control device 24 is also programmed to determine an actual mass flow rate of vapor through the flow path 12 during choked flow conditions in accordance with a linear function of the upstream pressure, and determine the actual mass flow rate of the vapor through the flow path 12 during non-choked flow conditions in accordance with a nonlinear function of the upstream pressure and the downstream pressure.

Choked flow conditions exist when the upstream pressure is at least equal to about twice the downstream pressure, and non-choked flow conditions exist when the upstream pressure is less than about twice the downstream pressure. The control device 24 is programmed to instruct the flow valve 22 (as indicated by control circuitry 28) to increase flow if the actual flow rate is less than the desired flow rate, and to decrease flow if the actual flow rate is greater than the desired flow rate. The size of an aperture in the flow restrictor 14 is initially determined by the fluid pressures at the inlet and the outlet of the MFC 10, and clearly can be adjusted from the initial values.

By "control device" 24 it is meant herein a device or mechanism used to regulate or guide the operation of the MFC 10. The control device 24 preferably comprises a computer processing unit (CPU) including a processor and memory. The control device 24 operates in a feedback loop to maintain the desired flow at all times.

Equations performed by the control device 24 for computing the mass flow rate from the measured reservoir pressures during both choked flow and non-choked flow conditions are disclosed in U.S. Pat. No. 5,868,159, which is assigned to the assignee of the present disclosure and incorporated herein by reference. In general, the control device 24 stores user input parameters necessary for carrying out the calculations. For example, the cross-sectional diameter of the aperture in the flow restrictor 14 is typically input by a user and, indirectly, the discharge coefficient of the flow restrictor. Values of the molecular weight, the universal gas constant, and the specific heat ration for several precursor gases may be input or previously stored in the control device. The parameters as well as a desired flow rate can be entered into the control device 24 through a user input device (not shown), such as a keyboard and monitor for example, via an analog set point.

The determination by the control device 24 of the mass flow rate also forms the basis of a feedback loop for adjusting the flow valve 22 in response to changes in fluid pressure within the upstream reservoir and/or the downstream reservoir to ensure that the actual flow rate is the same as the input desired flow rate. Information on flow rate as a function of the flow valve control current is preferably stored in the control device 24 in order to quicken the response time of the MFC 10.

The pressure measurement device 20 can be any type of pressure transducer capable of measuring fluid pressures within the range of interest. For example, the pressure measurement device can include an absolute pressure transducer 20. Preferred pressure measurement devices comprise Baratron® capacitance manometers available from MKS Instruments, Inc. of Andover, Mass. (www.mksinst.com).

The flow, or control, valve 22 may be any kind of valve for controlling the flow of fluid through the flow path 12 in response to a control signal provided from the control device 24. Preferably, the flow valve 22 and the control device 24 accommodate all flow rates from a complete shut off position (providing zero flow) to a complete open position (providing maximum flow), including flow rates required for choked as well as non-choked flow, although under certain applications it may be desirable to design the controller for only one flow regime. The specific characteristics of the flow valve 22 will depend on the expected delivery pressure range of the precursor material and the dimensions of the flow path 12 and the flow restrictor 14, and can be, for example, as a solenoid valve, a throttle valve or a flapper valve. A preferred valve is a proportioning solenoid control valve 22.

The flow path 12 is maintained at a constant, desired temperature preferably by surrounding the flow path with temperature control means, including thermal insulating means, a heater 30, and one or more temperature sensors 32 for sensing the temperature(s) along the flow path and for operating the heater in a feedback arrangement so as to maintain the temperature of the flow path at a predetermined fixed temperature. Specifically, the control device 24 employs feedback control loops for accurately controlling the temperature of the fluid (and for maintaining the temperature of the flow path 12 at a desired temperature) in response to changes in fluid flow. Signals sent from the temperature sensors 32 to the control device (as indicated by control circuitry 34) operate to controllably adjust the heater 30 (as indicated by control circuitry 36) and, thus, the temperature of the vapor in the flow path 12. A predetermined temperature set point or range can be programmed into the control device 24 to ensure that the fluid is maintained at the desired temperature or range.

By providing accurate flow rate measurement for non-choked flow conditions, the pressure-based MFC 10 of the present disclosure can be used to deliver gaseous reactants from liquid and non-dissolved solid precursors characterized by a wide range of vapor pressures at the delivery temperatures.

Thus, the pressure-based MFC 10 of the present disclosure may be used to monitor and control the delivery of vapors to a process, or reaction, chamber in a variety of industrial applications, including the manufacture of semiconductor devices using precursor materials having relatively low vapor pressures. Such precursor materials include liquid precursors having low vapor pressures and solid precursors which sublime, i.e., enter the gaseous state directly from the solid state. Alternatively, the solid precursor materials may be melted at an appropriate temperature and the mass flow of the gaseous reactants derived therefrom may be determined using the MFC 10 of the present disclosure, without the use of a solvent.

As a consequence, the pressure-based MFC 10 of the present disclosure is particularly suitable for use in systems that require delivery of gaseous reactants of high purity to a processing chamber. In addition, the pressure-based MFC 10 of the present disclosure effectively and more reliably models the relationship between upstream fluid pressure and mass flow rate, since it is capable of determining and controlling mass flow rate with high accuracy and fast response time over a wide range of flow rates in both the choked and non-choked flow regimes for a wide variety of precursor fluids.

Other advantages of the pressure-based MFC 10 of the present disclosure include the versatility of the unit. A single MFC 10 according to the disclosure can be used in applications in which, formerly, several MFCs, each calibrated for a particular gas, temperature, pressure and/or a particular flow rate range, were required. For example, the MFC 10 can be used to control the flow rate of a vapor derived from a precursor characterized by a vapor pressure ranging as low as 2 torr or lower, to at least 760 torr or higher, at temperatures of up to at least 250° C. or higher. In addition, the pressure transducer 20, heating element 30, CPU 24, valve 22 and controlling circuitry which comprise the MFC 10 are provided in a relatively compact, integral unit. Furthermore, the calibration and computations are performed in-line by the CPU 24. The feedback control loops are digitally controlled for improved accuracy and response time; however, both analog and digital operation are permitted. The on-board calibration feature of the present disclosure provides additional accuracy and reliability, as calibration of the MFC 10 can be done at multiple increments of full scale readings instead of merely at 0 and 100 percent full scale. In addition, calibration of the individual components, namely, the pressure transducer 20, is not required.

Figure 3:
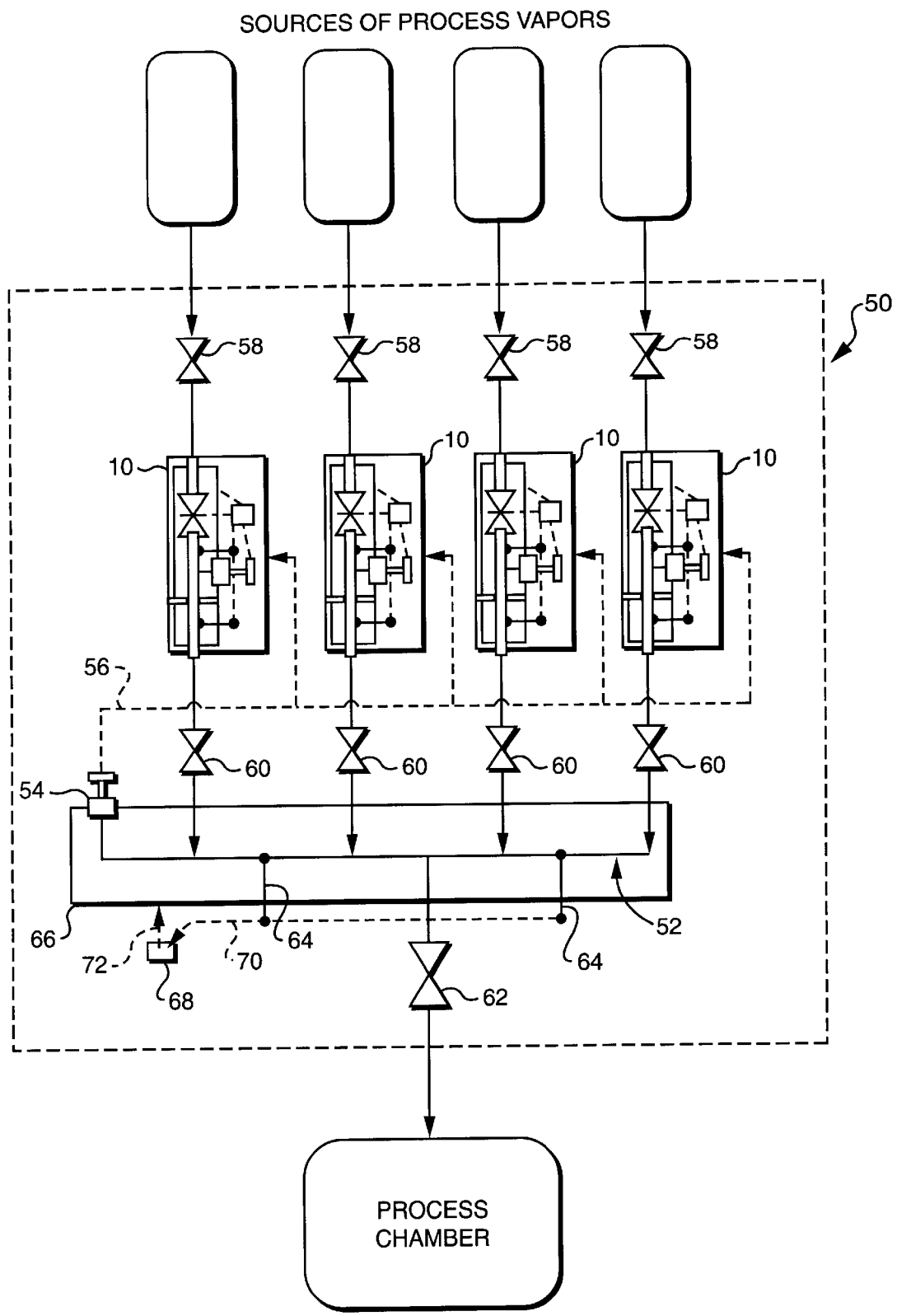
FIG. 3 is a simplified schematic diagram of a system according to the present disclosure, including a plurality of the pressure-based mass flow controllers of FIG. 2.

Referring now to FIG. 3, a mass flow controller system 50 according to the present disclosure for controlling the flow rates of vapors derived from a plurality of sources is shown. The system 50 of FIG. 3 includes a mass flow controller 10 according to FIG. 2 for each of the plurality of sources. The system 50 further includes a manifold 52 connecting the downstream reservoirs 18 of the MFCs 10, and a downstream pressure measurement device 54 connected to the manifold 52 for providing an indication of the downstream pressure to the control devices 24 of the MFCs (as indicated by control circuitry 56). The pressure measurement device 54 can comprise an absolute pressure transducer, and preferably comprises a Baratron® capacitance manometer.

By providing a single downstream pressure measurement device 54 for use by all of the MFCs 10, as opposed to providing each MFC with its own downstream pressure measurement device, among other benefits and advantages, a simpler and less expense mass flow control system 50 is provided.

As shown in FIG. 3, the system 50 also includes inlet valves 58 for connecting the upstream reservoirs 16 of the MFCs 10 to their respective sources of vapor, and outlet valves 60 connecting the downstream reservoirs 18 of the MFCs to the manifold 52, whereby at least one of the mass flow controllers 10 can be made to communicate with the manifold 52. A valve 62 is also provided for connecting the manifold 52 to the process chamber.

The system 50 can additionally include temperature measurement devices 64 connected to the manifold 52, a heater 66 for heating the manifold, and a control device 68 (i.e., CPU) for maintaining the manifold at a constant, desired temperature, similar to the temperature control system of each MFC 10. Specifically, the control device 68 is programmed to receive a desired vapor temperature from a user input device, and receive an indication of actual vapor temperature within the manifold 52 from the temperature measurement devices 64 (as indicated by control circuitry 70). The control device 68 then instructs the heater 66 (as indicated by control circuitry 72) to increase heat to the manifold 52 if the actual vapor temperature within the manifold is less than the desired vapor temperature, and instruct the heater to decrease heat to the manifold if the actual vapor temperature within the manifold is greater than the desired vapor temperature. Alternatively, a single temperature control system can be provided for the mass flow controller system 50 in place of the separate systems for each MFC 10 and the system for the manifold 52.

Figure 4:
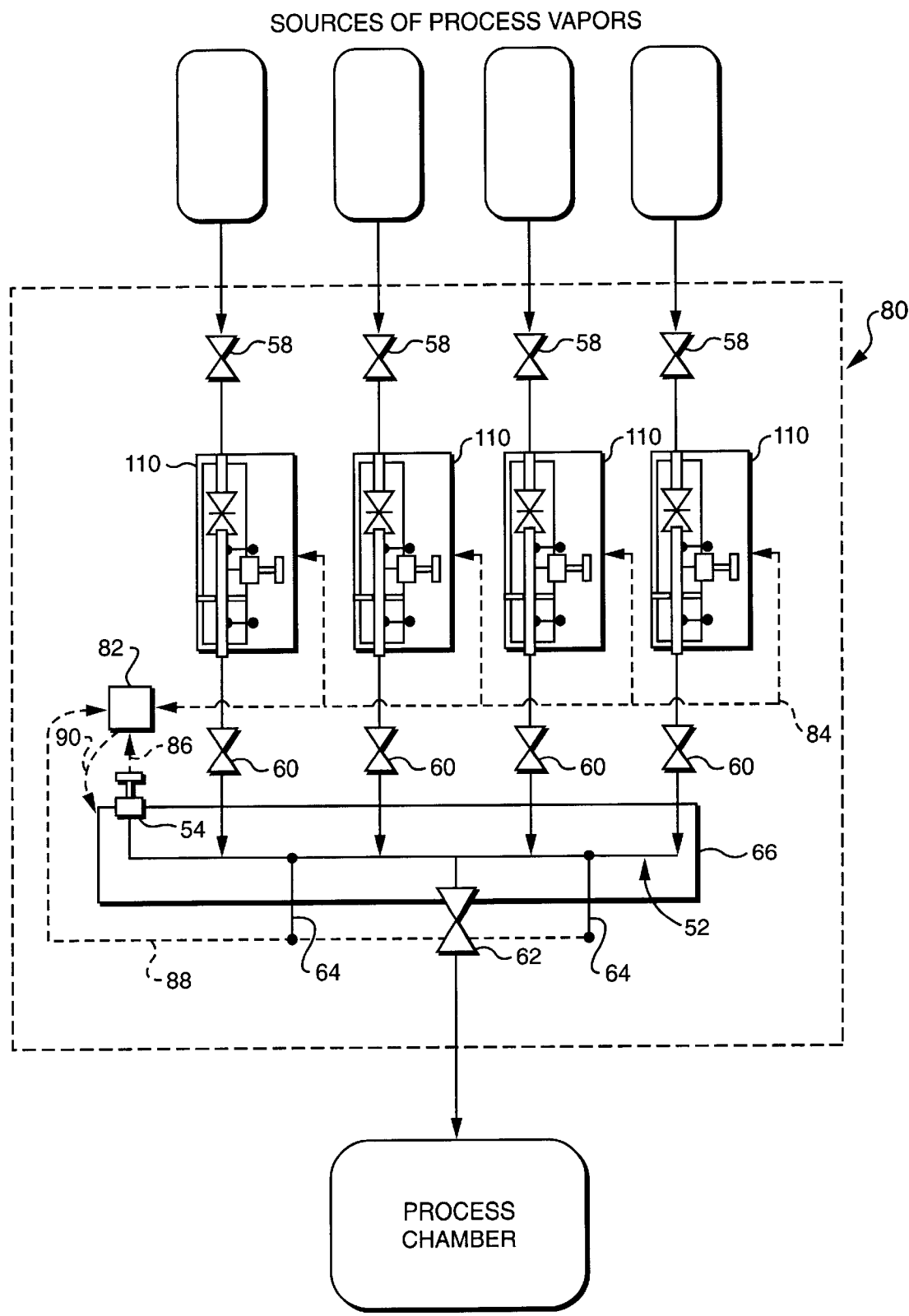
FIG. 4 is a simplified schematic diagram of another pressure-based mass flow controller system according to the present disclosure.

Referring to FIG. 4, another mass flow controller system 80 according to the present disclosure is shown. The system 80 of FIG. 4 is similar to the system 50 of FIG. 3, and elements that are the same have the same reference numerals.

The system 80 includes a mass flow controller 110 for each of the plurality of vapor sources. The MFCs 110 of FIG. 4 are similar to the MFCs 10 of FIG. 3 except that the MFCs 110 are not provided with their own CPUs. Instead the system 80 is provided with a single control device (i.e., CPU) 82 connected to each of the MFCs 110 (as indicated by control circuitry 84) and connected to downstream pressure measurement device 54 (as indicated by control circuitry 86) of the manifold 52. The control device 82 controls the flow valves 22 of each MFC 110 based upon upstream and downstream pressure readings provided by the upstream pressure measurement devices 20 of the MFCs 110 and the downstream pressure measurement device 54 of the manifold 52. The control device 82 is also preferably connected to the temperature measurement devices 64 and the heater 66 (as indicated by control circuitry 88, 90) of the manifold 52, for maintaining the manifold at a constant, desired temperature.

By providing a single control device 82 for use by all of the MFCs 110, as opposed to providing each MFC with its own control device, among other benefits and advantages, a simpler and less expense mass flow control system 80 is provided.

Although a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims.

What is claimed is:

1. A mass flow controller for controlling the flow rate of a vapor from a source, the mass flow controller comprising:
   A) a flow path for connection to the source of vapor;
   B) a flow restrictor dividing the flow path into an upstream reservoir and a downstream reservoir;
   C) an upstream pressure measurement device connected to the upstream reservoir;
   D) a flow valve connected to the flow path before the upstream reservoir;
   E) a control device programmed to,
      i) receive and store a desired flow rate from a user input device,
      ii) receive an indication of upstream pressure from the upstream pressure measurement device,
      iii) receive an indication of downstream pressure from a remote downstream pressure measurement device connected to the downstream reservoir,
      iv) determine an actual mass flow rate of vapor through the flow path in accordance with a linear function of the upstream pressure when the upstream pressure is at least equal to about twice the downstream pressure,
      v) determine the actual mass flow rate of the vapor through the flow path in accordance with a nonlinear function of the upstream pressure and the downstream pressure when the upstream pressure is less than about twice the downstream pressure,
      vi) instruct the flow valve to increase flow if the actual flow rate is less than the desired flow rate, and
      vii) instruct the flow valve to decrease flow if the actual flow rate is greater than the desired flow rate.

2. A mass flow controller according to claim 1, further comprising:
   A) at least one temperature measurement device connected to the flow path;
   B) a heater for heating the flowpath; and
   C) the control device is also programmed to
      i) receive a desired vapor temperature from the user input device,
      ii) receive an indication of actual vapor temperature within the flow path from the temperature measurement device,
      iii) instruct the heater to increase heat to the flow path if the actual vapor temperature is less than the desired vapor temperature, and
      iv) instruct the heater to decrease heat to the flow path if the actual vapor temperature within the flow path is greater than the desired vapor temperature.

3. A mass flow controller according to claim 1, wherein the pressure measurement device comprises a pressure transducer.

4. A system for controlling the flow rates of vapors derived from a plurality of sources, the system including a mass flow controller according to claim 1 for each of the plurality of sources, and further comprising:
   A) a manifold connecting the downstream reservoirs of the mass flow controllers; and
   B) a downstream pressure measurement device connected to the manifold for providing an indication of the downstream pressure to the control devices of the flow controllers.

5. A system according to claim 4, further comprising valves connecting the downstream reservoirs of the mass flow controllers to the manifold, whereby at least one of the mass flow controllers can be made to communicate with the manifold.

6. A system according to claim 4, further comprising:
   A) a temperature measurement device connected to the manifold;
   B) a heater for heating the manifold; and
   C) the control device is also programmed to
      i) receive a desired vapor temperature from the user input device,
      ii) receive an indication of actual vapor temperature within the manifold from the temperature measurement device,
      iii) instruct the heater to increase heat to the manifold if the actual vapor temperature within the manifold is less than the desired vapor temperature, and
      iv) instruct the heater to decrease heat to the manifold if the actual vapor temperature within the manifold is greater than the desired vapor temperature.

7. A system according to claim 4, wherein the downstream pressure measurement device comprises a pressure transducer.

8. A system for controlling the flow rates of vapors derived from a plurality of sources, the system comprising:
   A) a flow path for connection to each of the plurality of vapor sources;
   B) flow restrictors dividing each of the flow paths into an upstream reservoir and a downstream reservoir;
   C) upstream pressure measurement devices connected to each of the upstream reservoirs;
   D) a manifold connecting the downstream reservoirs of the mass flow controllers;
   E) a downstream pressure measurement device connected to the manifold;
   F) a control device programmed to, for each flow path,
      i) receive an indication of upstream pressure from the upstream pressure measurement device of the flow path,
      ii) receive an indication of downstream pressure from the downstream pressure measurement device,
      iii) determine an actual mass flow rate of vapor through the flow path in accordance with a linear function of the upstream pressure when the upstream pressure is at least equal to about twice the downstream pressure, and
      iv) determine the actual mass flow rate of the vapor through the flow path in accordance with a nonlinear function of the upstream pressure and the downstream pressure when the upstream pressure is less than about twice the downstream pressure.

9. A system according to claim 8, wherein:
   A) each flow path further includes a flow valve positioned before the upstream reservoir of the flow path; and
   B) the controller is further programmed to,
      i) receive a desired flow rate from a user input device for each flow path, and
      ii) for each flow path,
         instruct the flow valve to increase flow if the actual flow rate is less than the desired flow rate, and
         instruct the flow valve to decrease flow if the actual flow rate is greater than the desired flow rate.

10. A system according to claim 8, further comprising valves connecting the downstream reservoirs of the flow paths to the manifold for selectively connecting the flow paths to the manifold.

11. A system according to claim 8, further comprising:
   A) temperature measurement devices connected to the flow paths and the manifold;
   B) heaters for heating the flow paths and the manifold; and
   C) the control device is also programmed to
      i) receive a desired vapor temperature from the user input device,
      ii) receive an indication of actual vapor temperature from the temperature measurement devices,
      iii) instruct the heaters to increase heat to the flow paths and the manifold if the actual vapor temperature is less than the desired vapor temperature, and
      iv) instruct the heaters to decrease heat to the flow paths and the manifold if the actual vapor temperature is greater than the desired vapor temperature.

12. A system according to claim 8, wherein the pressure measurement devices comprise pressure transducers.

13. A method for delivering vapors from a plurality of sources, comprising:
   A) connecting a flow path to each source of vapor;
   B) dividing each of the flow paths into an upstream reservoir and a downstream reservoir;
   C) restricting vapor flow between the reservoirs of each of the flow paths;
   D) determining a pressure in the manifold; and
   E) for each flow path,
      i) determining a pressure in the upstream reservoir of the flow path,
      ii) determine an actual mass flow rate of vapor through the flow path in accordance with a linear function of the upstream pressure when the upstream pressure is at least equal to about twice the downstream pressure, and iii) determine the actual mass flow rate of the vapor through the flow path in accordance with a nonlinear function of the upstream pressure and the manifold pressure when the upstream pressure is less than about twice the downstream pressure.

14. A method according to claim 13, further comprising:
A) receiving a desired flow rate from a user input device for each flow path; and
B) for each flow path,
  i) increasing vapor flow to the flow path if the actual flow rate is less than the desired flow rate, and
  ii) decreasing vapor flow to the flow path if the actual flow rate is greater than the desired flow rate.

15. A method according to claim 13, further comprising selectively connecting the flow paths to the manifold.

16. A method according to claim 13, further comprising:
A) measuring actual vapor temperature within the manifold; and
B) for each flow path,
  i) receiving a desired vapor temperature from the user input device,
  ii) measuring actual vapor temperature within the flow path,
  iii) increasing heat to the manifold if the actual vapor temperature in the manifold is less than the desired vapor temperature of the flow path,
  iv) decreasing heat to the manifold if the actual vapor temperature in the manifold is greater than the desired vapor temperature of the flow path,
  v) increasing heat to the flow path if the actual vapor temperature in the flow path is less than the desired vapor temperature of the flow path, and
  vi) decreasing heat to the flow path if the actual vapor temperature in the flow path is greater than the desired vapor temperature of the flow path.

* * * * *